United States Patent [19]

Nossek et al.

[11] Patent Number: 4,800,572
[45] Date of Patent: Jan. 24, 1989

[54] ADAPTER FREQUENCY RANGE EQUALIZER FOR DIGITAL RADIO RELAY SYSTEMS

[75] Inventors: Josef A. Nossek, Iffeldorf; Georg Sebald; Berthold Lankl, both of Munich; Klaus Boshold, Kaufering, all of Fed. Rep. of Germany

[73] Assignee: Siemens Aktiengesellschaft, Berlin and Munich, Fed. Rep. of Germany

[21] Appl. No.: 91,020

[22] Filed: Aug. 31, 1987

[30] Foreign Application Priority Data

Oct. 31, 1986 [DE] Fed. Rep. of Germany ....... 3637051

[51] Int. Cl.$^4$ .............................................. H04B 3/04
[52] U.S. Cl. ...................................... 375/14; 375/15; 333/18
[58] Field of Search ...................... 375/11, 12, 13, 14, 375/15; 333/18, 28 R; 364/724, 574

[56] References Cited

U.S. PATENT DOCUMENTS

| | | | |
|---|---|---|---|
| 3,670,269 | 6/1972 | Starr et al. | 333/18 |
| 3,781,722 | 12/1973 | Pierson | 333/28 R |
| 3,883,830 | 5/1975 | Hekimian et al. | 333/28 R |
| 3,978,435 | 8/1976 | Luvison et al. | 375/14 |
| 4,100,495 | 7/1978 | Luvison et al. | 375/14 |
| 4,139,829 | 2/1979 | Isago et al. | 333/18 |
| 4,361,892 | 11/1982 | Martin | 375/14 |
| 4,477,913 | 10/1984 | Koya et al. | 375/13 |
| 4,500,999 | 2/1985 | Takatori et al. | 333/28 R |
| 4,656,644 | 4/1987 | Ozaki | 375/15 |

FOREIGN PATENT DOCUMENTS 1181817 1/1985 Canada .
0092907 2/1983 European Pat. Off. .
0179393 10/1985 European Pat. Off. .

OTHER PUBLICATIONS

IEEE 1985 New York ICC 85, vol. 3, Jun. 23-26 1935, Design and Performance of an Adaptive if Equalizer For a 140 Mbit/s 16WAM System-Giorio-Muratore-Palestini.
Advanced Adaptive Equalization of Multilevel-QAM-Digital Radio Systems-Sebald, Lanki, Nossek, Transmission Systems, Radio Relay Design Siemens AG Munich, W. Germany.
316 Commutation & Transmission 6(Sep. 1984) No. 3, Issy-les-Moulineaux, France Systems Hertziens 140Mbit/s A 4 ET 6 GHZ STN 65-140-STN 36-140 pp. 65-82.

Primary Examiner—Robert L. Griffin
Assistant Examiner—Stephen Chin
Attorney, Agent, or Firm—Hill, Van Santen, Steadman & Simpson

[57] ABSTRACT

An adaptive frequency range equalizer for digital radio relay systems which require adaptive frequency range equalizers which have coefficients that are adjustable. That are different possibilities for setting the coefficients of the transversal filter in such equalizers in a manner such that the transmission function of the transversal filter is either of the minimum phase type (mp), or the linear phase type (lp) or the non-minimum phase type (mnp). The invention discloses a method and apparatus for obtaining either of the three transmission functions for the transversal filter.

7 Claims, 3 Drawing Sheets

ADAPTER FREQUENCY RANGE EQUALIZER FOR DIGITAL RADIO RELAY SYSTEMS

BACKGROUND OF THE INVENTION

1. Field of the Invention

The invention relates in general to an adaptive frequency range equalizer for digital radio relay systems in which an intermediate frequency position has mounted therein a transversal filter with adjustable coefficients and has means for analyzing the spectrum for the setting of the coefficients.

2. Description of the Prior Art

Basic concepts of adaptive frequency range equalizers for digital radio relay systems is disclosed in the publication Proceedings ICC'85 No. 39.1.1-39.1.5 which reports related problems in the article entitled "Design and Performance of an Adaptive IF Equalizer For 140 Nbits/s16 QAM System".

In digital radio relay systems, particularly when multi-stage quadrature amplitude modulation is used, a preliminary equalization is carried out of the power density spectrum of the received signal which has experienced linear distortions as a result of multi-path propagation. Such frequency range equalization can be optimized by using time range equalizers and combination. Particular consideration must be given to the so-called "non-minimum phase" channel situation which cannot be equalized by base-band equalizers with quantitized feedback (decision feedback) with the same level efficiency as the "minimum-phase" channel transmission function.

The previously known frequency range equalizers which operate in the intermediate frequency position obtain the information required for setting them up from filter probes in the IF position (spectrum analysis filter bank) and utilize minimum phase networks composed of concentrated elements to carry out the equalization.

Generally so-called "slope equalization", "square equalization" or "moving notch equalization" functions are performed all of which exhibit a considerably higher level of efficiency in the minimum phase than in the non-minimum phase situation.

Also, the danger exists in such equalizer arrangements, that in specific situations in combination with adoptive time range equalizers they can have an harmful influence due to the generation of echoes which the baseband time range equalizer is unable to eliminate due to its finite length.

The following prior art is of interest:

1. International Conference On Communications, 23-26, June 1985, Chicago, Band 3, Pages 1234-1238, IEEE, New York, US, E., Giorio et al, "Design and Performance of an adaptive IF Equalizer for 140 Mbit/s 16 QAM System".

2. Communication & Transmission, Band 6, Nr. 3, September 1985, Pages 65-82, Issy-les-Moulineaux, FR; G. Bonnerot et al, "Systemes Hertiziens 140 Mbit/s a 4 et 6 GHz STN 65-140-STN 36/40".

3. ICC '86, Nr. 46.5.1-46.5.5, Advanced Adaptive Equalization of Multilevel QAM Digital Radio Systems, Proc. ICC.

4. European Patent E-OS No. 0 179 393

5. Proc. ICC'85 Nr. 39.1.1-39.1.5, Design and Performance of an Adaptive Equalizer for a 140 Mbit/S 16 QAM System).

6. European Patent Application No. 0 092 907.

7. U.S. Pat. No. 4,361,892—Martin

8. Canadian Pat. No. 1,181,817.

SUMMARY OF THE INVENTION

It is an object of the present invention to overcome the problems of the prior art and the described technical problem as solved using a transversal filter structure which can be optimized by specifying its topology for minimum phase or non-minimum phase channels. A compromise between the two options (linear phase) is also possible. A special design for a low cost construction is provided. Also, there is provided a cost favorable economical acquisition criteria for the equalization of the power density spectrum in the baseband of a QAM system.

In an adaptive frequency range equalizer according to the invention, this objective is accomplished by selecting the coefficients which determine the transmission function of the transversal filter so that they are minimum phase type, linear phase type or non-minimum phase type.

European Pat. No. OS 0 179 393 discloses that transversal filters can approximate a given transmission function (equalization function) of arbitrary accuracy in a frequency band specified by the periodicy of its frequency response. Also, it is possible to produce a minimum phase, linear phase or non-minimum phase equalization function by specifying particular specifications regarding topology and coefficient values.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
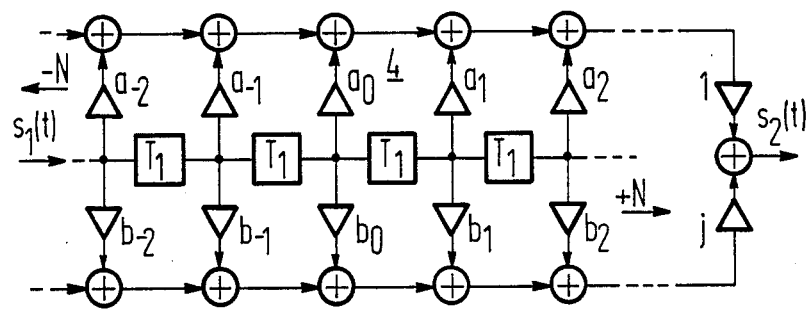
FIG. 1 illustrates in circuit diagram form a known complex transversal filter.

FIG. 1 illustrates an exemplary embodiment of a transversal filter 4 in which a plurality of delay elements T1 are chain connected as illustrated using multipliers or evaluating elements and adders. The connection of the adders is indicated by the circles with a plus sign and the evaluation or multiplication elements which represent the individual multiplier coefficients are indicated by $a_{-n}-a_{+n}$ and $b_{-n}-b_{+n}$ (arrows "$-N$" and "$+N$"). The input signal is indicated by $s_1(t)$ and the output signal is indicated by $s_2(t)$. The output signal $s_2(t)$ is obtained through the evaluating elements referenced "l" and "j" in an output adder as shown. For the complex embodiment of the transversal filter indicated by the reference 4, the invention is based on the following considerations.

The serial-in/parallel-out structure of a transversal filter with complex coefficients is always minimum phase for $$a_{-n}, b_{-n} = 0, \quad n = 1, 2, \ldots N$$

$$\sum_{n=1}^{N} a_n^2 + b_n^2 \leq a_o^2 + b_o^2$$

is always linear-phase for $$a_n = a_{-n}, b_n = -b_{-n} \; n=0, 1, 2, \ldots N$$

and is always non-minimum phase for $$a_n, b_n = 0 \quad n = 1, 2, \ldots N$$

$$\sum_{n=1}^{N} a_{-n}^2 + b_{-n}^2 \leq a_o^2 + b_o^2$$

The described conditions are sufficient but are not essential for the minimum phase and non-minimum phase situations.

This means that by specific structural specifications or limits for the coefficient values, the frequency range equalizer can be optimized and constructed (switched) for specific channel situations. For cost considerations, however, simplified real embodiments are of interest.

The following is generally valid for real embodiments.

In general, the electrical length $T_1$ of the delay element of the transversal filter is specified to be such that no periodic repetitions of the transmission function occur in the spectrum which is to be equalized. If simple "slope adjuster" and "bulge adjuster" equalization functions are to be performed, additional factors occur with regard to the specification of the delay elements which permits a particularly cost favorable real constructions.

Figure 2:
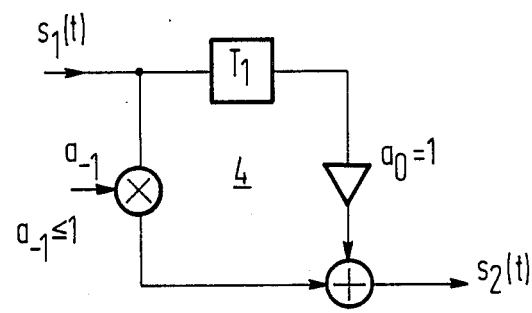
FIG. 2 is a diagram of a special embodiment of a transversal filter having only one delay element and the delay element is dimensioned so that either a non-minimum phase slope adjuster ($T_1 = 5/(4f_{ZF})$) or a non-minimum phase bulge equalizer ($T_1 = 3/(2f_{ZF})$) is obtained.

FIG. 2 illustrates an exemplary embodiment wherein the equalizer consists of only one delay element $T_1$ to which is assigned the coefficients $a_o = 1$ and $a_{-1}$ is less than 1. FIG. 2 represents two special embodiments in which either a slope adjustment or bulge adjustment equalization function is performed by a particular selection of the delay time. For example, if a selection of $T_1 = 5/(4f_{ZF})$ is made, a non-minimum phase slope adjuster is produced whereas if, for example, $T_1 = 3/(2f_{ZF})$ is selected, a non-minimum phase bulge equalization function is produced.

Thus, FIG. 2 is a diagram of a particularly simple non-minimum phase slope adjuster in which the delay element is specified to be such that a zero transition of the "cosine" frequency response occurs in the center of the spectrum and no periodic repetitions occur within the spectrum. If the value of the adpative coefficient always remains less than 1, the equalizer is always a non-minimum phase equalizer. For most applications, a simple slope adjuster of this kind in combination with a baseband time range equalizer and where appropriate with a recursive coefficient such as described in the proceedings ICC'86 pages 46.5.1 to 46.5.5 is sufficient.

By simple dimensioning of the delay time in the transversal structure in FIG. 2, a so-called bulge equalizer can be produced. Than an extreme value of the "cosine" frequency response rather than a "zero transition" occurs in the center of the spectrum.

Figure 3:
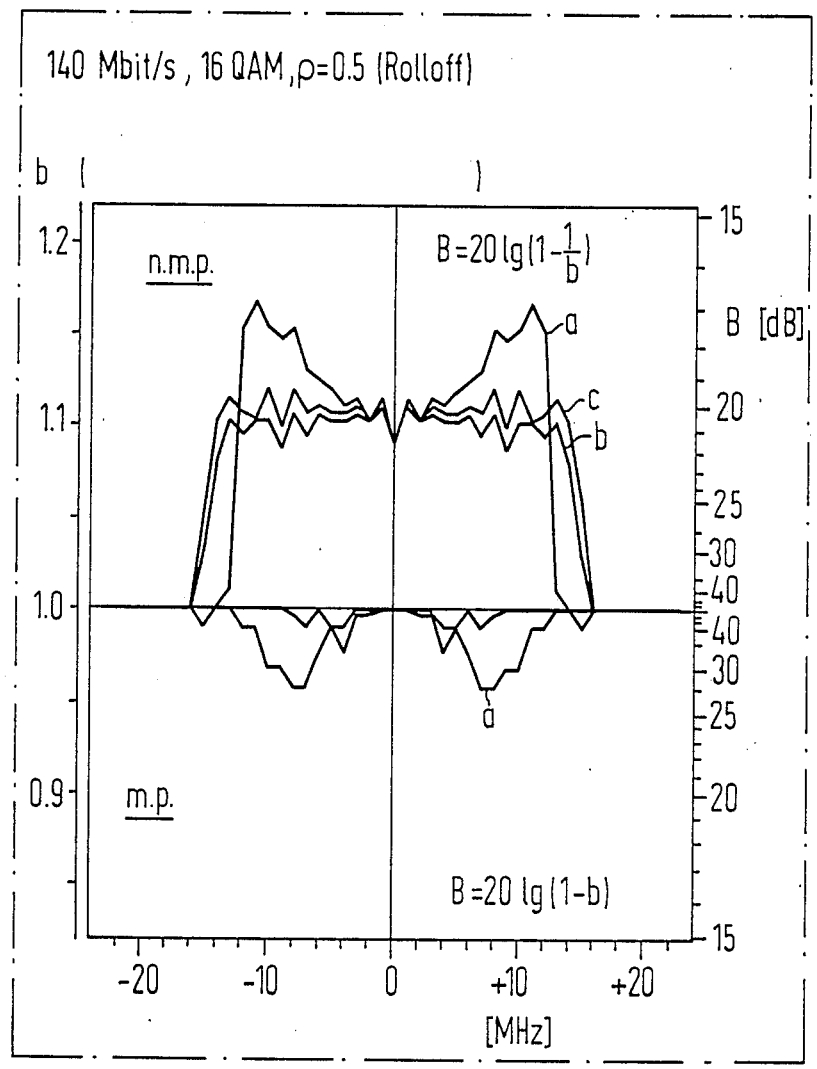
FIG. 3 illustrates the characteristics of a 16 QAM/140 Mbit/s-system which has a baseband equalizer having seven complex tappings and a simple slope adjuster of the minimum phase or non-minimum phase type.

FIG. 3 represents the characteristics of a 16 QAM/140 Mbit/s-system. Depending upon the relative notch frequency, the relative echo amplitude b and attenuation B (notch step) are plotted in decibels. Curve a represents a modified base-band equalizer having seven tappings one of which is recursive as described in the publication Proc. ICC'86, Pages 46.5.1 to 46.5.5; and curve b represents additional slope adjusters corresponding to FIG. 2 as the non-minimum phase type and curve c as minimum phase type. In the case of the characteristic represented in FIG. 3, it has been assumed that the slope adjuster eliminates the level different produced by the channel distortions at the two Nyquist frequencies.

The following principles apply to a simple realization of the invention.

The delay elements can fundamentally be formed as described in European OS No. 0 179 393 using SAW (surface acoustic wave) technology and can be commonly implemented by means of the completion of the Nyquist spectrum shaping. Depending upon neighboring channel interference, it can also be effective to separate the two functions and to construct the delay elements in a conventional manner from concentrated elements.

The acquisition of the criteria (spectrum analysis) is of particular importance.

Figure 4:
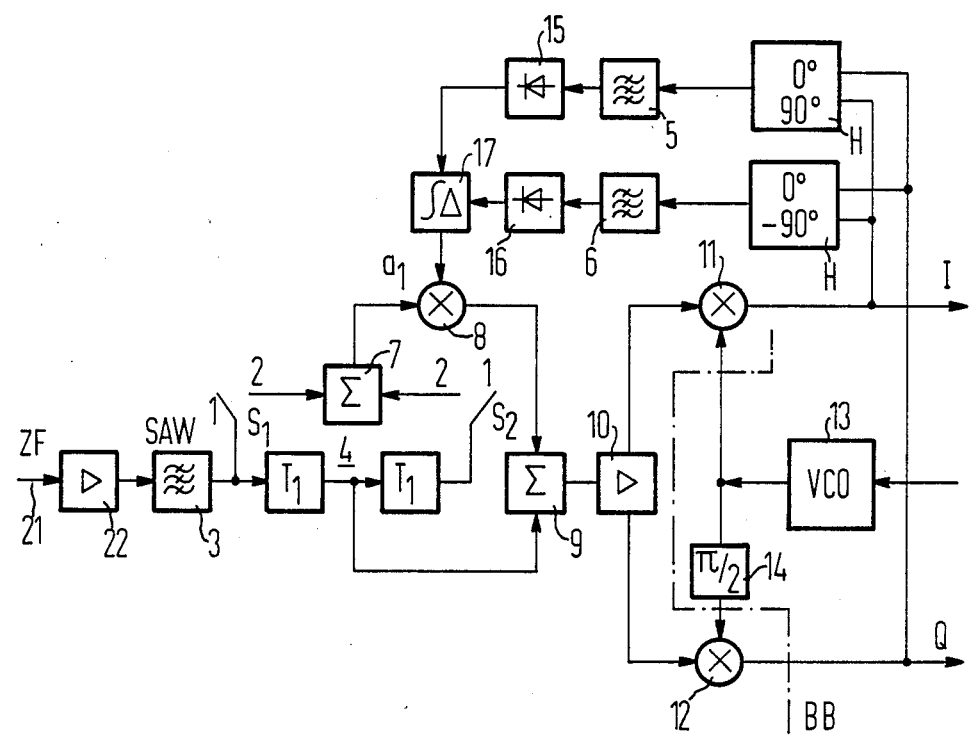
FIG. 4 is a block diagram of a circuit for controlling the setting up of the transversal filter.

FIG. 4 illustrates in block form an arrangement in which filter probes are provided in the base-band with a considerable reduction of cost.

In the exemplary embodiment of FIG. 4, an input 21 may be ZF which indicates an intermediate frequency input, for example, in the range of 72–140 MHz. The input is supplied to an amplifier 22 which supplies its output to a surface acoustic wave filter 3. The transversal filter is designed by 4 and in the exemplary embodiment consists of only two delay elements $T_1$ and $T_1'$ which are connected by way of the switches S1 and S2 selectively to an adder 7. The adder 7 supplies its output to a multiplier 8 in which the coefficient $a_1$ is to be set. The output of the multiplier 8 is connected to an adder 9 which receives a second input from the junction point between the two delay elements $T_1$ and $T_1'$. An amplifier 10 receives the output of the adder 9 and produces two outputs which are supplied to multipliers 11 and 12 which receive inputs from a voltage control oscillator 13. The multiplier 11 receives the input from the voltage controlled oscillator 13 directly whereas the multiplier 12 receives the output of the oscillator 13 through a 90° phase shift element 14.

Broken line BB indicates that the base-band follows this section of the circuit. The in-phase signal is designated I and the quadrature signal is designated Q. Both the in-phase signal I and the quadrature signal Q are supplied through ±90° hybrid circuits H and H'. The first hybrid circuit H supplies its output to a filter probe 5 and the second hybrid circuit H' supplies its output to a second filter probe 6. The output of filter probe 5 is supplied through a rectifier 15 to a difference integrator circuit 17. The output of the filter probe 6 is supplied through a rectifier 16 to the difference integrator 17. The output of the integrator 17 is supplied to the multiplier 8 as shown.

The base-band BB lies between 0 (and $1+\rho$) 17 MHz.

When the switches $S_1$ and $S_2$ are in the positions 1/1 which is the position shown in FIG. 4, no equalization occurs. If the switches $S_1$ and $S_2$ are in the position 2/1 wherein switch $S_1$ is moved to contact position 2 and switch $S_2$ is in the position shown in FIG. 4, a non-minimum phase slope adjuster is formed, where for example, $T_1 = 5/4f_{ZF}$). When the switches $S_1$ and $S_2$ are in the 1/2 position wherein the switch $S_1$ is in the position shown in FIG. 4 and the switch $S_2$ engages contact 2 a minimum phase slope adjuster is formed. When the $S_1$ and $S_2$ are in the 2/2 positions a linear-phase slope adjuster is formed. In the example, it has been assumed that the intermediate frequency $f_{ZF} = 140$ MHz. It has also been assumed that the system is a 16 QAM/140 Mbit/s system and that the roll-off factor $\rho = 0.5$. Thus, FIG. 4 represents a simple example which allows the setting up criteria for the coefficient setting of the transversal filter 4 which is connected in the IF channel to be obtained from the base-band BB. In other words, by varying the positions of the switches $S_1$ and $S_2$, the different results described above can be obtained.

It is seen that the invention provides a new and novel adaptive frequency range equalizer for digital radio relay systems and although it has been described with respect to preferred embodiments, it is not to be so limited as changes and modifications may be made which are within the full intended scope as defined by the appended claims.

We claim as our invention:

1. An adaptive frequency range equalizer for a digital radio relay systems (DRS) in which an intermedate frequency band (ZF), there is provided a transversal filter (4) which has adjustable coefficients ($a_n + jb_n$, n from $-N$ to $+N$) and which has means for spectrum analysis for setting the coefficients wherein coefficients ($a_n + jb_n$) determine the transmission function of the transversal filter (4) so that it can be the minimum-phase type (mp), linear-phase type (lp) or non-minimum-phase type (nmp), wherein the criteria for setting the coefficients ($a_n + jb_n$) of the transversal filter (4) are obtained from an in-phase base-band signal (I) and from a 90 degree signal (Q), a pair of hybrids (M) which receive said in-phase base-band signal (I) and said 90 degree signal (Q), a pair of filter probes (5, 6) connected to receive the outputs of said pair of hybrids (H) and a difference integrator connected to receive the outputs of said pair of filter probes.

2. An adaptive frequency range equalizer as claimed in claim 1, wherein said equalizer contains first and second series connected delay elements ($T_1$) and first and second switch means ($S_1$, $S_2$) which can be set to different positions such that the minimum-phase (mp), linear-phase (lp), and non-minimum-phase (nmp) transmission functions can be selected, an adder with one input connectible by said first switch to the input of said first time delay element and a second input of said adder connectible to the output of said second time delay element by said second switch.

3. An adaptive frequency range equalizer as claimed in claim 2, wherein for in the case of purely non-minimum-phase (nmp) operation, one of said two delay elements and said pair of switch means ($S_1$, $S_2$) are disconnected so that only one delay element ($T_1$) operates in the circuit.

4. An adaptive frequency range equalizer as claimed in claim 2 or 3, wherein the delay time of said delay elements is selected to be such that the equalizer for the frequency band which is to be equalized operates as a slope-adjuster ($T_1 = 5/(4f_{ZF})$ where $f_{ZF}$ is an intermediate frequency.

5. An adaptive frequency range equalizer as claimed in claim 2 or 3, wherein the delay time of said delay elements ($T_1$) is selected to be such that the equalizer for the frequency band which is to be equalized operates a bulge adjuster ($T_1 = 3/(2f_{ZF})$ where $f_{ZF}$ is an intermediate frequency.

6. An adaptive frequency range equalizer for a digital relay system comprising, a surface acoustic wave filter which receives an incoming intermediate frequency signal, a first time delay $T_1$ connected to receive the output of said surface acoustic wave filter, a second time delay $T_1$ connected to receive the output of said first time delay $T_1$, a first two position switch $S_1$ connected to receive the output of said surface acoustic wave filter, a second two position switch $S_2$ connected to receive the output of said second time delay $T_1$, a first adder connected to said first and second switches, a first multiplier connected to receive an input from said first adder, a second adder connected to receive an input from first multiplier and connected to receive an input from the junction point between said first and second time delays, second and third multipliers receiving the output of said second adder, a voltage controlled oscillator supplying an in-phase input to said second multiplier and a quadrature input to said third multiplier, first and second ninety degree hybrids each receiving the outputs of said second and third multipliers, first and second filter probes, respectively, connected to said first and second hybrids, a different integrator connected to receive the outputs of said first and second filter probes and said first multiplier receiving the output of said difference integrator.

7. An adaptive frequency range equalizer according to claim 6 including first and second rectifiers respectively connected between said first and second filter probes and said difference integrator.

* * * * *